This is a continuation-in-part of copending application Ser. No. 13,761, filed Mar. 9, 1960, now abandoned.

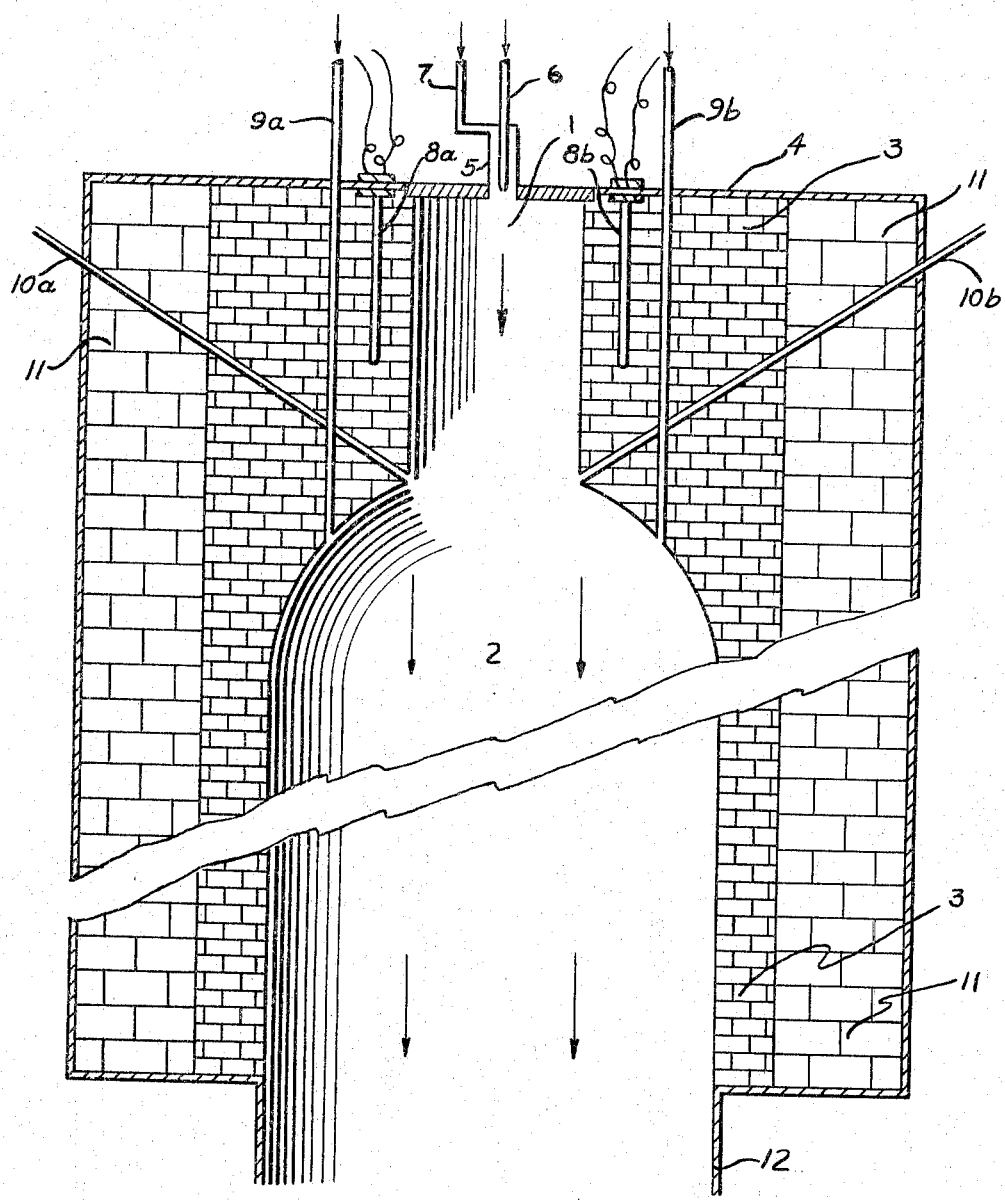
INVENTOR.
JOHN P. WIKSWO
EARL W. NELSON
BY
Evans Kahn 3,325,252
PREPARATION OF IRON OXIDE AND CHLORINE BY TWO-ZONE OXIDATION OF IRON CHLORIDE
John Peter Wikswo, Amherst, and Earl William Nelson, Lynchburg, Va., assignors to American Cyanamid Company, Stamford, Conn., a corporation of Maine
Filed Feb. 26, 1964, Ser. No. 347,617
8 Claims. (Cl. 23—200)

The present invention relates to the production of iron oxide and chlorine by the combustion of iron chloride with oxygen, and particularly relates to a method for increasing the efficiency of iron chloride oxidizers and iron chloride oxidation processes.

At the present time iron chloride is produced as a by-product in the production of titanium dioxide pigment from oxidic iron-titanium ores, notably ilmenite and rutile. In the process, a suitable ore is chlorinated to form a gaseous product composed of iron chloride and titanium tetrachloride. The chlorides are separated, and titanium dioxide pigment is produced by combustion of the titanium tetrachloride with oxygen, releasing chlorine which is recycled. The economics of the process require that the chlorine in the iron chloride likewise be recovered. In practice, this latter step has proved difficult because the combustion of iron chloride with oxygen goes only to an intermediate equilibrium, so that yields of chlorine per pass have been poor. The principal theoretical reactions involved in the combustion of iron oxide with oxygen are as follows:

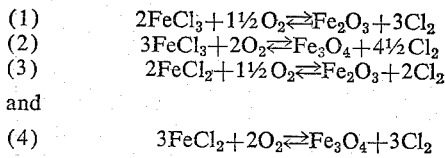

(1) $2FeCl_3 + 1\tfrac{1}{2}O_2 \rightleftharpoons Fe_2O_3 + 3Cl_2$
(2) $3FeCl_3 + 2O_2 \rightleftharpoons Fe_3O_4 + 4\tfrac{1}{2}Cl_2$
(3) $2FeCl_2 + 1\tfrac{1}{2}O_2 \rightleftharpoons Fe_2O_3 + 2Cl_2$ and (4) $3FeCl_2 + 2O_2 \rightleftharpoons Fe_3O_4 + 3Cl_2$ The discovery has now been made that the amount of iron oxide and chlorine produced by combustion of iron chloride with oxygen is increased by performing the combustion in two zones. In the first zone, iron chloride and oxygen are reacted at a temperature between about 650° C. and 1000° C. or higher. In this zone an approximately equilibrium mixture forms consisting essentially of the desired iron oxide and chlorine, and unreacted iron chloride and oxygen. The second zone has a temperature at least 25° C. less than the first zone, and in this zone the reaction is shifted towards a new equilibrium with production of a new mixture containing more ferric oxide and chlorine (and less unreacted iron chloride and oxygen) than the product of the first zone.

The invention will be more particularly described with reference to the drawing, which is a vertical section (partly schematic) of one form of reactor according to the present invention.

In the drawing, 1 designates the upper or first cylindrical reaction zone and 2 designates the lower or second cylindrical reaction zone; both zones are defined by firebrick 3. The top of the reactor is sealed by refractory-lined steel disc 4 through which passes burner 5 having ferric chloride supply tube 6 and oxygen supply tube 7. The upper reaction zone is surrounded by eight electric heaters of which two, 8a and 8b are shown.

Between the electric heaters but nearer the periphery of the reactor are eight alundum pipes of which two, 9a and 9b, are shown by means of which cold particulate matter may be showered as coolant peripherally into the lower reaction chamber; the pipes are supplied from a central hopper via individually controlled feeders (not shown). Four additional pipes extending radially along the quadrants of the reactor represented by pipes 10a and 10b permit solid particulate coolant to be showered into the central part of the lower reactor so that the contents of this chamber are substantially uniformly cooled.

The apparatus is encased in thermal insulation 11. The product is discharged through conduit 12 to a conventional analysis and recovery system.

The apparatus as shown in the drawing is constructed of materials which have heretofore been used for the construction of ferric chloride oxidizers.

The invention does not depend upon the particular form of apparatus in which it is practiced, and other types of apparatus may be advantageously used in connection therewith.

It is thus within the scope of the invention to perform the combustion in two individual, spaced reactors, the first reactor operating at 750° C. and the second operating at 675° C., the product of the first reactor being cooled while in transit from one reactor to the other, and to perform the process in a reactor having more than two successively cooler reaction zones.

The apparatus is prepared for operation by bringing the two zones to operating temperature and then introducing oxygen and iron chloride into the upper reactor. The invention does not depend upon the particular way in which the two reagents are introduced or their proportions. Thus the reagents may be introduced as opposed streams, or separately and concurrently, as shown in the drawing. Moreover, it is within the scope of the invention to introduce the iron chloride as a solid, as a gas, or under pressure as a liquid with downward flow of the gaseous streams as shown in the drawing or to react the iron chloride and oxygen in fluidized beds, representing the two or more zones of the present invention.

When proceeding by the method shown in the drawing, a coolant material (for example coarse sand, Alundum, ferric oxide or other inert solid) is introduced through the coolant supply pipes in amount sufficient to decrease the temperature of the second zone by at least 25° C. and preferably 50° C.–100° C. The gaseous product is passed through a cyclone to remove the coolant particles and iron oxide and is then cooled to condense the unreacted iron chloride which is also recycled. The non-condensable fraction is chlorine containing a small amount of unreacted oxygen.

The term "iron chloride" as used herein includes ferric chloride-ferrous chloride, and mixtures thereof, and particularly the 90:10 ferric chloride, ferrous chloride mixture frequently recovered from the chlorination of oxidic ferrotitaniferous ores.

As to ratios, we find it advantageous to employ a substantial stoichiometric excess of one reagent over the other so as to cause substantially complete reaction of one of the components in the mixture, thereby simplifying the product recovery problem. The molar ratio of iron chloride to oxygen may thus be between 4:1 and 1:4. In practice, we find it more convenient to supply the iron chloride in excess as oxygen is the more troublesome component to recover. Negligible loss of oxygen results when the molar ratio of iron chloride to oxygen is between 2.5:1 and 1.5:1.

The invention likewise does not depend upon the particular temperatures employed in the reactor zones. As a practical matter, however, we find that significant increase in efficiency is not realized unless the temperature of the second zone is 25° C. lower than the first zone. We prefer to operate so that the temperature of the first reaction zone is between 700° C. and 900° C. and the temperature of the second zone is about 50° C.–100° C. cooler but above 450° C. and to ensure that the rate of flow of the reacting gaseous stream is such that equilibrium is at least three-quarters attained in each of the reaction zones.

The invention will be more particularly described in the example which follows. This example constitutes the embodiment of the invention and is not to be construed as a limitation thereon.

*Example*

The following illustrates the combustion of iron chloride with oxygen a reactor similar to that shown in the drawing.

The reactor is constructed of firebrick jacketed in thermal insulation 24 ft. high overall.

The upper (first) reaction chamber is 2.5 ft. in diameter by 4 ft. high, and the lower (second) reaction chamber is 6.5 ft. in diameter by 20 ft. high. Eight high-capacity electric heaters surround the upper reaction chamber to provide auxiliary heat thereto. The lower zone is cooled by cold coarse (60 mesh) alumina particles dropped through eight ½" diameter pipes surrounding the upper zone.

The inlet end of the upper chamber is fitted with a burner of the concentric tube type. The inner burner tube is fitted with a spray head, and to this is supplied molten ferric chloride under pressure at 350° C. Oxygen at 200° C. is supplied to the outer tube.

The discharge end of the apparatus carries a continuous analyzer for oxygen and ferric chloride. The reactor product is piped to a bag filter for collection of the iron oxide dust and alundum particles and to a chlorine-ferric chloride recovery system. Thermocouples are provided which indicate the temperatures prevailing in the several zones of the apparatus.

The upper zone is brought to operating temperature (750° C.) by the electric heaters and by combustion of carbon monoxide and oxygen admitted through the central burner tubes at the top of the reactor, and flow of coarse alumina is begun to maintain the lower chamber at 700° C. When thermal equilibrium is attained, supply of carbon monoxide is switched to ferric chloride. The ferric chloride is supplied at the rate of 316 tons per day and the rate of oxygen admission is controlled so that 90%–95% fixation of oxygen as iron oxide results; the average supply rate is 25.9 tons per day.

77.6 tons per day of iron oxide and 103.2 tons of chlorine are recovered as product; 2.4 tons per day of oxygen are lost.

When supply of coolant particles is discontinued and the temperature of the second chamber is allowed to rise to 750° C. the amount of oxygen lost rises to 6.4 tons per day.

We claim:

1. A process for producing iron oxide and chlorine by the oxidation of iron chloride with oxygen which comprises bringing reactant iron chloride into reactive contact with oxygen in a first reaction zone having a temperature between about 650° and 1000° C. for a period sufficient to permit the substantial formation of a first equilibrium mixture containing iron chlorides, oxygen, iron oxides and chlorine; introducing the so-formed equilibrium mixture into a second reaction zone maintained at a temperature above about 450° C. but at least about 25° below the temperature of said first reaction zone, whereby said first equilibrium mixture substantially reaches equilibrium at the temperature of said second reaction zone thus forming a second equilibrium mixture which is, relative to said first equilibrium mixture, richer in iron oxides and chlorine; and recovering the free chlorine and iron oxides from said second equilibrium mixture.

2. A process according to claim 1 wherein the reactant iron chloride is substantially pure ferric chloride.

3. A process according to claim 1 wherein the reactant iron chloride is a 90:10 ferric chloride-ferrous chloride mixture.

4. A process according to claim 1 wherein reactant iron chloride and oxygen are introduced into the first reaction zone in a molar ratio between 4:1 and 1:4.

5. A process according to claim 1 wherein reactant iron chloride and oxygen are introduced into the first reaction zone in a molar ratio between 2.5:1 and 1.5:1.

6. A process according to claim 1 wherein reactant iron chloride is introduced into the first reaction zone in stoichiometric excess over reactant oxygen.

7. A process according to claim 1 wherein the temperature of the first reaction zone is between 700° and 900° C. and the temperature in said second reaction zone is 50°–100° lower.

8. A process for producing iron oxide and chlorine by the reaction of iron chloride and oxygen which comprises introducing iron chloride and oxygen in a molar ratio between about 2.5:1 and 1.5:1 into a first reaction zone wherein the temperature is between about 700° and 900° C. thereby forming a first equilibrium mixture having iron chlorides, iron oxides, oxygen and chlorine, and then introducing said first equilibrium mixture into a second reaction zone having a temperature above 450° C. but about 50° below that of the first reaction zone whereat it is maintained until the substantial formation of a second equilibrium mixture richer in iron oxide and chlorine relative to the first equilibrium mixture.

References Cited

UNITED STATES PATENTS 1,992,685   2/1935   Wescott _____ 23—200
3,092,456   6/1963   Nelson et al. _____ 23—200

OSCAR R. VERTIZ, *Primary Examiner.*

J. J. BROWN, G. T. OZAKI, *Assistant Examiners.*

UNITED STATES PATENT OFFICE
CERTIFICATE OF CORRECTION

Patent No. 3,325,252                                                June 13, 1967

John Peter Wikswo et al.

It is hereby certified that error appears in the above numbered patent requiring correction and that the said Letters Patent should read as corrected below.

Column 3, lines 42 and 43, for "average supply" read -- average oxygen supply --.

Signed and sealed this 18th day of February 1969.

(SEAL)
Attest:

Edward M. Fletcher, Jr.                                      EDWARD J. BRENNER
Attesting Officer                                                       Commissioner of Patents